United States Patent [19]
Shima et al.

[11] 4,269,380
[45] May 26, 1981

[54] FLAT TYPE CABLE SUSPENSION STRUCTURE

[75] Inventors: Eiji Shima, Yokohama; Masao Shimizu, Funabashi; Hiroshi Den, Yotsukaido, all of Japan

[73] Assignees: FEPS International, Ltd., Minato; The Fujijura Cable Works, Tokyo, both of Japan

[21] Appl. No.: 941,473

[22] Filed: Sep. 12, 1978

[51] Int. Cl.$^3$ .............................................. F16L 3/08
[52] U.S. Cl. ................................. 248/74 R; 187/1 R
[58] Field of Search .................... 187/1 R; 191/12 R; 248/72, 74 A, 63, 68 R, 74 R; 403/387, 400

[56] References Cited

U.S. PATENT DOCUMENTS

| | | | |
|---|---|---|---|
| 1,799,114 | 3/1931 | Miller | 248/63 |
| 3,430,733 | 3/1969 | Smith | 187/1 R |
| 4,058,186 | 11/1977 | Mullis | 187/1 R |

FOREIGN PATENT DOCUMENTS

| | | | |
|---|---|---|---|
| 2348128 | 4/1975 | Fed. Rep. of Germany | 187/1 R |
| 2505628 | 8/1975 | Fed. Rep. of Germany | 248/68 R |
| 49-150696 | 12/1974 | Japan | |
| 51-73281 | 6/1976 | Japan | |
| 51-90094 | 7/1976 | Japan | |

*Primary Examiner*—J. Franklin Foss
*Attorney, Agent, or Firm*—Armstrong, Nikaido, Marmelstein & Kubovcik

[57] ABSTRACT

A flat type cable suspension structure comprises a horizontally disposed holder member having a first retaining means, a keeper member having a second retaining means and a flat type cable firmly held therebetween by clamping. The first retaining means and the second retaining means cooperate with each other to crook flat type cable so that the cable can be firmly retained in the present suspension structure. The present cable suspension structure can be constructed in a compact form, thereby facilitating installation of an elevator cable assembly within a limited spacing between the side wall structure of a hoistway and an elevator cage. Further, by the use of the present suspension structure, the cable assembly can be installed adjustably in horizontal and vertical directions.

8 Claims, 9 Drawing Figures

FIG. 1
FIG. 3
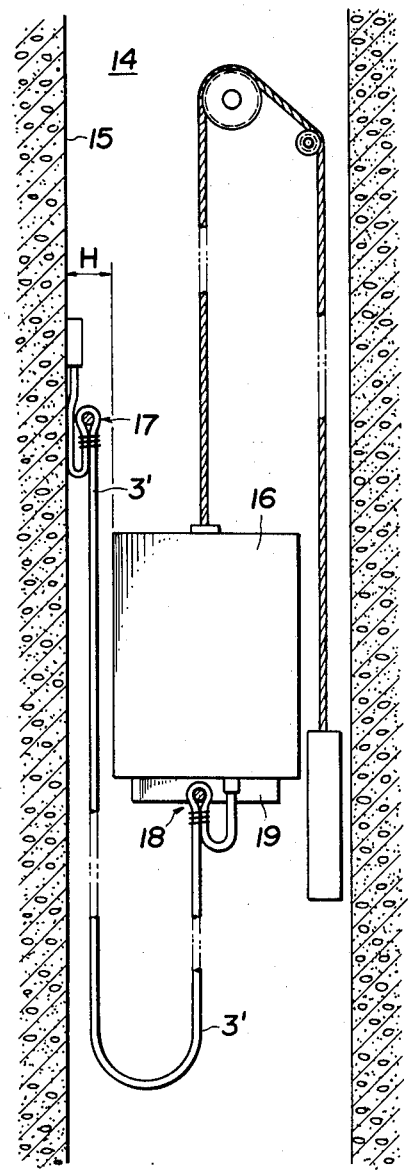
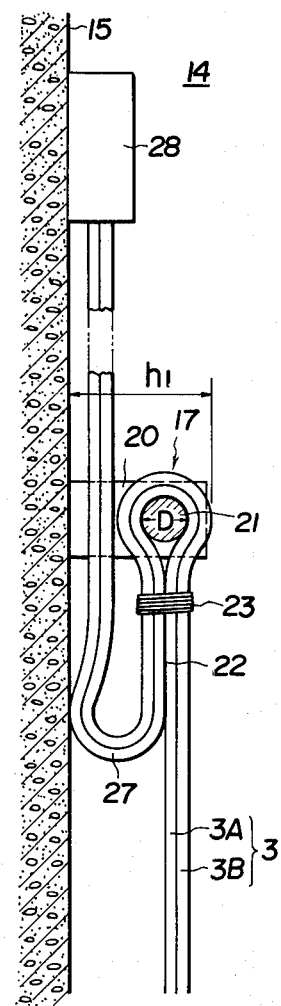

FIG. 5
FIG. 6
FIG. 7
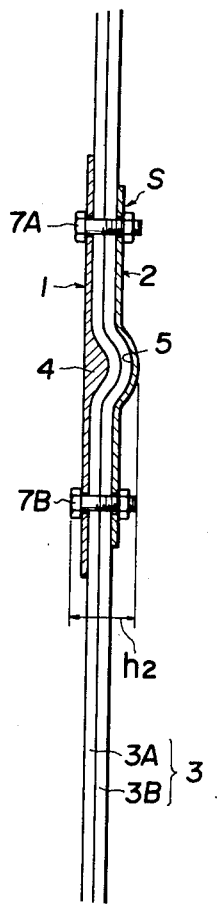
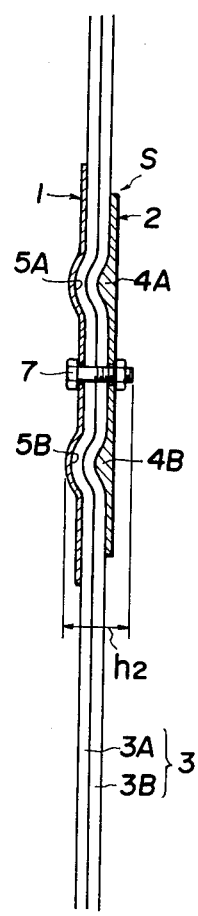
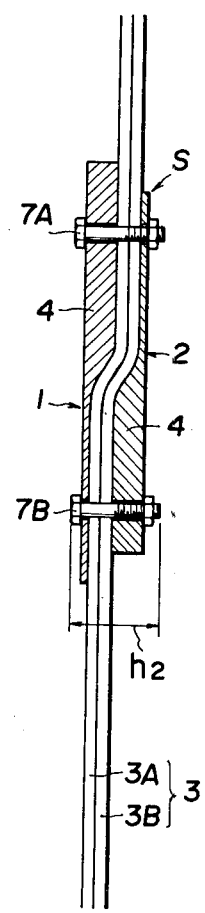

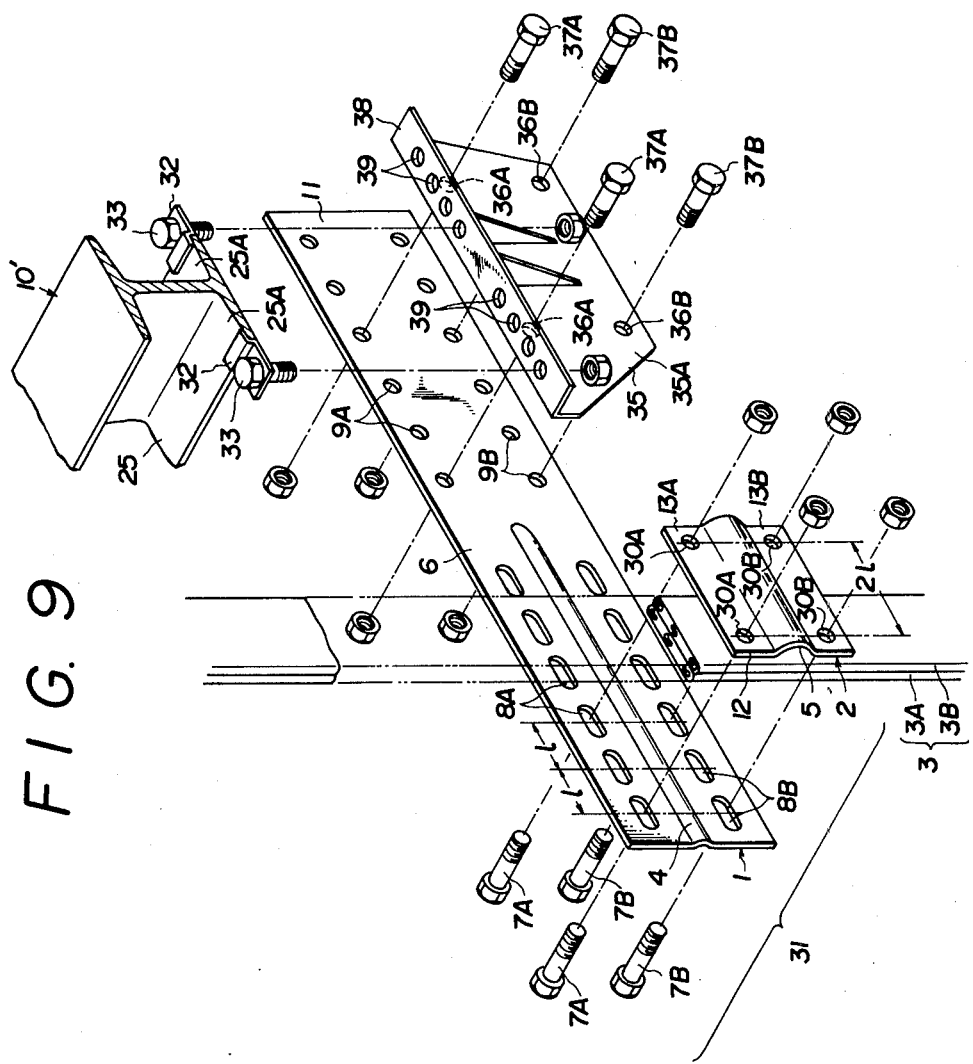

FLAT TYPE CABLE SUSPENSION STRUCTURE

This invention relates to a cable suspension structure, and more particularly to a flat type cable suspension structure which is especially useful for installing a flat type feeder cable for an electrically powered and substantially vertically moving construction, for example, an elevator.

In a general construction of an electrically powered elevator, there is present only a narrow gap or spacing between the side wall structure of an elevator well or vertical hoistway and an elevator cage adapted to vertically move along the hoistway. In the conventional elevator system, a plurality of elevator feeder cables of round type are arranged laterally and disposed within the narrow spacing in a vertically suspended fashion. One end of each of the cables is fixedly secured to the side wall structure, and the other end is secured to the bottom of an elevator cage, so that the cables are suspended through the curved portions formed intermediate their respective end portions. With such an arrangement, the cables are liable to undergo collision, twist, crossing, entangling and the like thereof during the vertical movement or travelling of the elevator cage due to the swing and sway of the cables. Further, because of the lateral arrangement of the round type cables, there is disadvantageously needed a large area laterally extended on the side wall structure of the hoistway for securing the cables to the side wall structure.

For eliminating such drawbacks as mentioned above, it was proposed to employ flat type cables and arrange them in such a manner that they are thicknesswise multi-laid one upon another. By the use of such flat type cables, it is possible to avoid swing and sway of the cables, leading to elimination of the collision, twist, crossing, entangling, and the like which are inevitably liable to occur when the round type cables are employed. The flat type cable suspension structure, however, has an inherent disadvantage that the total thickness of the bundle of multi-laid cables is large, leading to difficulty in disposing the bundle of cables within the limited spacing between the side wall structure of the hoistway and the elevator cage.

Accordingly, it is one and a principal object of the present invention to provide a flat type cable suspension structure which is capable of not only eliminating unfavorable collision, twist, crossing, entangling and the like of the feeder cables but also capable of disposing the cables within a limited spacing in a compact form.

It is another object of the present invention to provide a flat type cable suspension structure of the character described, which is simple in structure and can be easily assembled.

The foregoing and other objects, features and advantages of the present invention will be apparent to those skilled in the art from the following detailed description taken in connection with the accompanying drawings in which:

FIG. 1 is a schematic elevational view of an elevator system, showing the manner in which a feeder cable is suspended according to a conventional cable suspension structure;

FIG. 3 is a side elevational view of an essential portion of the elevator system of FIG. 2;

FIGS. 5 through 7 are side elevational view respectively of various forms of flat type cable suspension structures according to the present invention;

Figure 8:
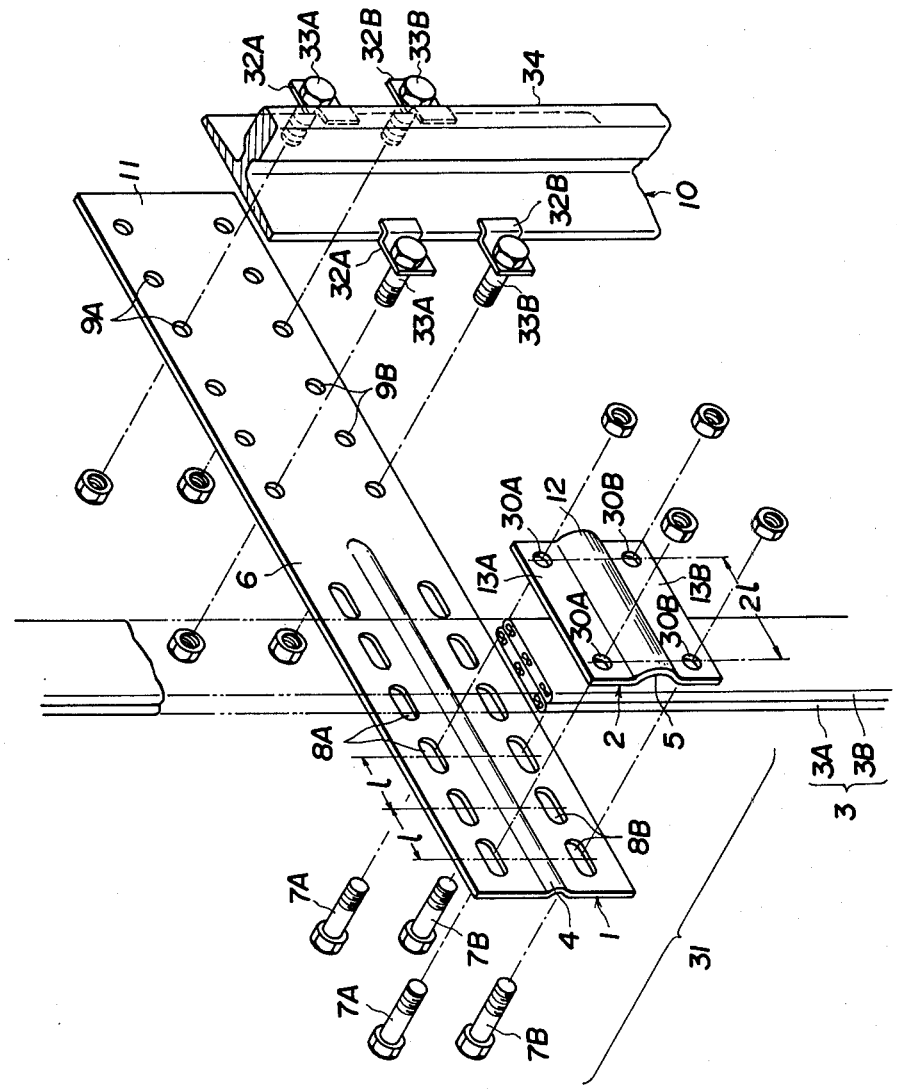

FIG. 8 is an exploded perspective view of a further form of the present cable suspension structure similar to the embodiment of FIG. 5, illustrating the manner in which the suspension structure is assembled and fixedly secured to the side wall structure of the hoistway; and FIG. 9 is a view similar to FIG. 8, illustrating the manner in which the structure is assembled and fixedly secured to the bottom of the elevator cage.

FIGS. 1 through 8, like parts or portions are designated by like reference numerals or characters.

Referring to FIG. 1, there is shown a schematic side elevational view of a conventional cable suspension structure in an elevator system. As described before, there is usually present only a limited narrow spacing H between a side wall structure 15 of a hoistway 14 and an elevator cage 16 adapted to vertically travel along the hoistway 14. In the general conventional elevator system, a plurality of round type cables 3' are employed which are laterally arranged in row along the side wall structure 15. Each of the cables is secured at its one end portion 17 to the side wall structure 15 and at the other end portion 18 to the elevator cage 16 at its bottom 19. Thus, the cables are vertically suspended through the curved portions formed intermediate their respective end portions. With such a construction, the suspended cables 3' undergo swing and sway during the travelling of the elevator cage, causing collision, twist, crossing, entangling and the like of the cables which lead to damage of the feeder cables and to accidents. In addition, as stated before, due to the laterally arranged structure, the installation of the feeder cables 3' needs a relatively large area on the side wall structure 15 on which the cables are securely disposed in row in a lateral arrangement.

Figure 2:
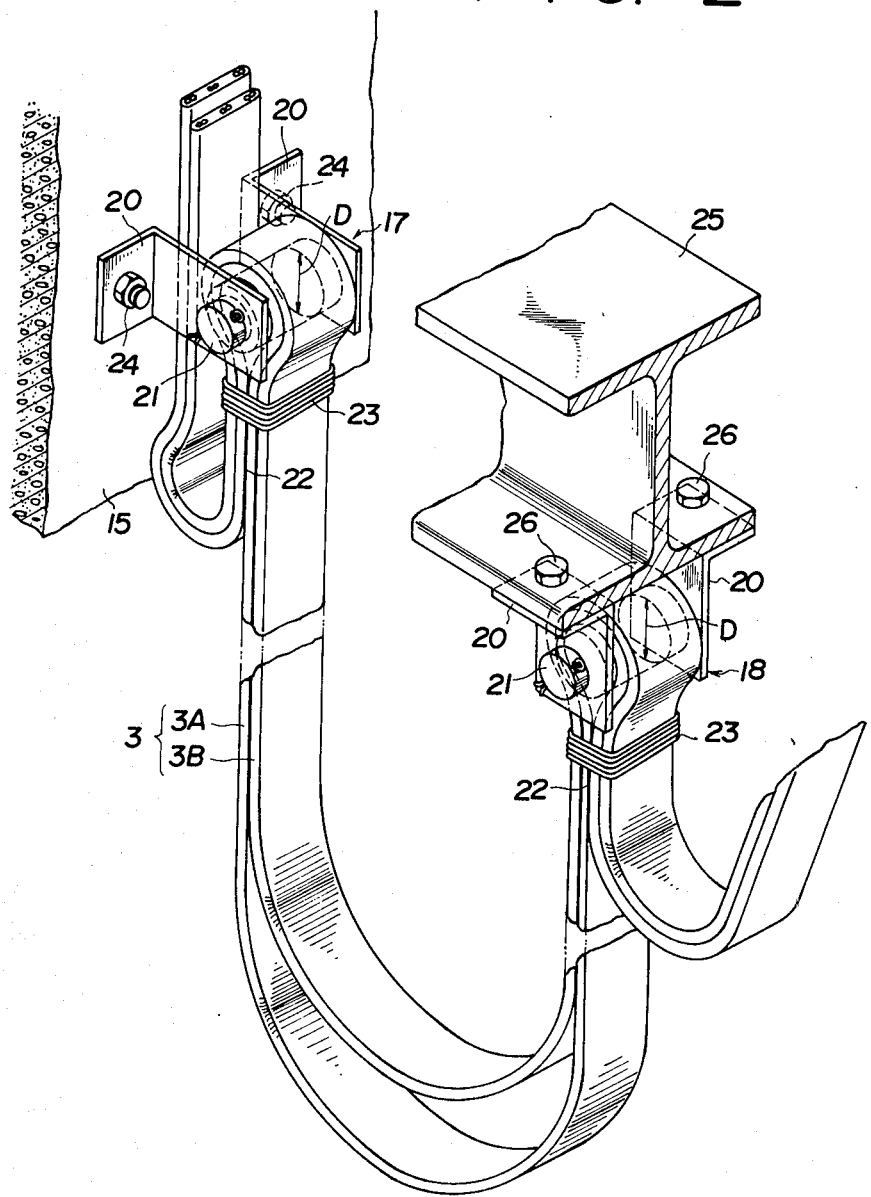
FIG. 2 is a perspective view of a portion of an elevator system, illustrating a conventional cable suspension structure employing a flat type cable.

With a view to eliminating such drawbacks accompanying the round type cables, a cable suspension as shown in FIGS. 2 and 3 has been proposed. In this conventional structure there are employed, flat type cables 3A, 3B are employed instead of commonly used round type cables having a circular cross-section. The flat type cables are relatively small in thickness and have a rectangular form in cross-section, and hence, the flat type cables are less susceptible to swing and sway in the direction of the width thereof than the conventional round type cables. The feeder cable assembly 3 comprises a predetermined number of cables, (for example 3A and 3B as in FIGS. 2 and 3) which are thicknesswise multi-laid one upon another. The cable assembly 3 is securely held, with its end portions 17 and 18, respectively, being folded over hanger bars 21, 21 and bound by binding means such as wires 23 at its overlapping portions 22, 22. The hanger bars 21, 21 are each supported by a pair of brackets 20, 20. The pair of brackets 20, 20 are secured to the surface of the wall structure 15 by means of stud bolts 24, 24 so that one end portion 17 of the cable assembly 3 is fixed to the side wall structure 15 of the elevator well 14. The other pair of brackets 20, 20 are secured to the bottom frame 25 of the elevator cage 16 by means of bolts 26,26 so that the other end portion 18 of the cable assembly 3 is fixed to the elevator cage 16 at its bottom.

Figure 4:
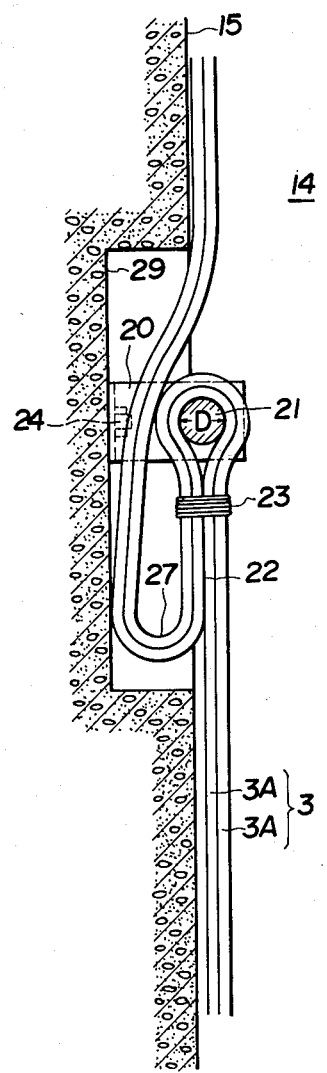
FIG. 4 is a side elevational view of another conventional cable suspension structure employing a flat type cable.

According to such conventional flat type cable suspension structure, a predetermined number of flat type cables can be installed and suspended in such a compact manner that they are thicknesswise multi-laid one upon another this contracts with the case of round type cables where a plurality of round type cables are laterally arranged in row along the side wall structure 15. Further, with such conventional cable suspension structure, the multi-laid flat type cables can be prevented from mutual collision, entanglement and the like thereof which are liable to occur due to swing and sway of the cables caused during the vertical movement of the elevator cage 15 when the round type cables are employed. This conventional arrangement of flat type cables, however, is not yet satisfactory. Illustratively stated, the required number of cables e.g. 3A, 3B are folded over the hanger bar 21 having a circular cross-section, and the folded portion is bulky as is seen in FIG. 3. In this connection, it is noted that the diameter D of the hanger bar 21 is determined taking into consideration the allowable curvature radius of the multi-laid cables 3A, 3B. Therefore, there is a limit in the amount that the diameter D of the hanger bar 21 can be decreased even though reduction of the bulk of the folded portion of the multi-laid cables is intended. In addition, the multi-laid cables 3A, 3B are turned back at 27 and extend upwardly for connection with a power supply terminal box (junction box) 28 secured to the side wall structure 15 at a level above the hanger bar 21. For this reason, it is necessary that the hanger bar 21 be disposed leaving a sufficient spacing from the side wall structure 15 to enable the multi-laid cables to extend between the side wall structure 15 and the folded portion of the cables. As a result, the length $h_1$ of each of the brackets 20 supporting the hanger bar 21 tends to be large according to an increase in number of cables constituting the cable assembly, so that the cable suspension structure is sometimes unable to be accommodated within the space H between the side wall structure 15 and the elevator cage 16. In order to cope with such difficulty, it is a common practice to provide a recess 29 in the side wall structure 15 of the hoistway 14 as depicted in FIG. 4 so that at least a part of such cable suspension arrangement or structure can be accommodated within the recess 29. However, it is necessary for a worker to do a dangerous chipping work in an acrobatic manner in order to form the recess 29 midway of the elevator well 14 which is of a deep vertical hole and has only a small floor area. Such a work causes the installation of the cable suspension structure to be very complicated and dangerous. In addition, since the cable assembly 3 comprising a predetermined number of cables 3A, 3B and so on must be turned back at 27 below the overlapping area 22 after it is folded over the hanger bar 21, the total length of the cables to be employed is increased by about twice the length of the folded and overlapping portion, as compared with that in the case of straight cable installation which does not have a overlapping portion 22. This additional cable is undesirable from an economic point of view. Furthermore, since the end portion 17 of the cable assembly 3 is secured unadjustably to the side wall structure 15 by means of the bracket 20, 20 rigidly fixed to the wall structure, it is impossible to easily change the position of the suspended cables once positioned in any direction way, vertically or horizontally, in the hoistway 14. Therefore, when it is required to actually change the position of disposition of the cable suspension arrangement or structure with respect to the side wall structure 15 because of an accidental error in the location of position of the cable suspension structure during construction, or because of unexpected obstacles such as a protrusion on the side wall structure 15 of the hoistway 14, the difficulties involved in changing the disposition of the cable suspension structure presents a great problem in the conventional method of installation of elevator cables.

As a result of the intensive studies of the present inventors with a view to developing an improved structure for suspending a flat type feeder cable, the present invention has been made.

Essentially, according to the present invention, there is provided a flat type cable suspension structure which comprises:

(a) a holder member fixedly secured with respect to the ground and having at its one side a first retaining means;

(b) a keeper member having at its one side a second retaining means; and (c) a flat type cable extending in a substantially vertical direction and securely held between said holder member and said keeper member;

said first retaining means cooperating with said second retaining means to crook the flat type cable in a thicknesswise direction, thereby engaging the flat type cable therebetween.

Preferred embodiments of the present invention will now be described with reference to FIGS. 5 to 9.

Referring now to FIG. 5, there is shown one form of a flat type cable suspension structure according to the present invention. Numeral 1 designates a holder member which is made of a rectangular metal plate such as a steel plate and has a horizontally elongated disposition. The holder member 1 has on its one side a ridge or projection 4 longitudinally extending along a central portion of the holder member. Numeral 2 designates a keeper member which is made of a rectangular metal plate such as a steel plate and has at its central portion a recess or groove 5 extending longitudinally and adapted to mate with the projection 4 of the holder member 1 through a flat type cable assembly. The holder member 1 is disposed in a vertical plane and mounted in a fixed relationship with respect to the ground or rigid structure, so that one face of the holder member 1 abuts against the vertical surface of, for example, the side wall structure 15 of the elevator well 14 as shwon in FIGS. 1 to 3. Against the opposite side of the holder member 1 formed with the projection 4, abuts one side of a vertically disposed flat type cable assembly 3 comprising a predetermined number of flat type feeder cables multi-laid one upon another. The keeper member 2 abuts against the other side of the flat type cable assembly 3. Thus, the cable assembly is sandwiched between the holder member 1 and the keeper member 2, with the groove 5, namely a second retaining means being registered with the projection 4, namely a first retaining means. The cable assembly 3 is firmly held between the members 1 and 2 by clamping bolts 7A, 7B passing through the members 1 and 2 at the upper and lower edge portions thereof. When the bolts are applied, the holder member 1 and the keeper member 2 are pressed toward each other so that the cable assembly 3 is bent or crooked in its thicknesswise direction under the coaction of the projection 4 and the groove 5 and engaged with the registering portion of the former with that of the latter. As a result, the cable assembly 3 is firmly held between the holder member and the keeper member 2, preventing the cable assembly being disengaged and vertically displaced.

In FIGS. 6 and 7, there are shown another and still another form of flat type cable suspension structure of the present invention, respectively. According to the embodiment shown in FIG. 6, on one side of the holder member 1 abutting against the flat type cable assembly 3, there are provided a pair of spaced recesses 5A and 5B each extending longitudinally thereof. In the keeper member 2 there are formed a pair of spaced projections 4A and 4B longitudinally extending on its side abutting the cable assembly 3. When the flat type cable assembly 3 is held between the holder member 1 and the keeper member 2, there is provided the same mating and clamping effect as attained in the first embodiment of this invention explained with reference to FIG. 5. That is, the flat type cables 3A, 3B and so on constituting the cable assembly 3 are firmly held between the holder and keeper members 1 and 2, because they are caused to be forcibly crooked at two positions where two pairs of projections 4A, 4B and recesses 5A, 5B mate with each other through the cable assembly 3. The holder and keeper members 1 and 2 are firmly held together by a single clamp bolt 7 passing through the two members 1 and 2 at their respective central portions. In the embodiment of the invention as shown in FIG. 7, the holder member 1 has an elevated or protruded portion 4 extending laterally at the upper half part of the holder member 1 on its side abutting against the flat type cable assembly 3, and a thinned portion extending laterally at the lower half part below the elevated portion 4. The keeper member 2 has a protruded portion 4 extending laterally at the lower half part thereof on its side abutting against the cable assembly 3 and a thinned portion extending laterally at the upper half part above the protruded portion 4. The protruded portion 4 and the thinned portion of the holder member 1 are complementary in shape respectively to the thinned portion and protruded portion 4 of the keeper member 2 so as to fit to each other, as depicted in FIG. 7.

At the time when the cable assembly 3 is firmly held between the holder and keeper members 1 and 2, it is caused to be forcibly bent or crooked at one position where the lower sloped edge portion of the protruded portion 4 of the member 1 and the upper sloped edge portion of the protruded portion 4 of the member 2 are disposed in opposed relationship to each other, thereby securely holding the cable assembly 3 so that disengagement or displacement of the flat type cable assembly can be effectively prevented.

As apparent from FIGS. 5, 6 and 7, various forms of flat type cable suspension structures according to the present invention can advantageously be contructed to have a small thickness $h_2$ and are suitable for installing an elevator cable assembly within a limited spacing between the side wall structure of the hoistway and the elevator cage.

Referring now to FIG. 8, there is shown an illustrative manner for assembling a flat type cable suspension structure 31 of the present invention, in which the embodiment of FIG. 5 is employed. The structure 31 comprises an elongated rectangular plate 6 which is made of, e.g., steel and horizontally disposed in a vertical plane. The plate 6 includes a holder portion 1 having a longitudinally extending projection 4 formed along the central portion of the width of the plate 6. The projection may be easily formed by pressing. A pair of rows of slots 8A, 8B are formed in the upper and lower halves of the holder portion 1, respectively, and adapted to receive bolts 7A, 7B passing therethrough. Between the rows of slots is formed the projection 4. The plate 6 also includes a mounting portion 11 extending from the holder portion 1. A pair of rows of holes 9A, 9B are formed in the mounting portion 11 as depicted, and adapted to receive bolts 33A, 33B passing therethrough. The structure 31 also comprises a keeper member 2 which is rectangular in shape and substantially shorter than the plate 6. The keeper member 2 has a pair of upper and lower pressing portions 13A and 13B, and a groove 5 formed therebetween. The groove 5 may be easily formed by pressing, and longitudinally extends along the central portion of the width of the keeper member 2 so that the groove 5 can be in registry with the projection 4 when the structure 31 is assembled. Two pairs of holes 30A, 30B are formed in the upper and lower pressing portions 13A and 13B of the keeper member 2, and adapted to receive the bolts 7A, 7B passing therethrough. The pair of holes 30A are spaced from each other at an interval of 2 l while the slots 8A are spaced from one another at an interval of l, that is, half the interval of the holes 30A. The same spatial relationships also apply to the pair of holes 30B and the slots 8B.

For installing the cable suspension structure 31, firstly, a predetermined number (two in the drawings) of cables 3A, 3B are laid one upon another to provide a multi-laid cable assembly 3. The cable assembly 3 is then sandwiched and held between the holder portion 1 of the plate 6 and the keeper member 2 by mating the projection 4 with the groove 5 through the cable assembly 3. The plate 6 and the keeper member 2 is fastened by means of the bolts 7A, 7B passing respectively through the holes 8A and 30A in couple and 8B and 30B in couple and nuts. The cable assembly 3 is thus firmly held between the holder portion 1 of the plate 6 and the keeper member 2, and extends vertically between the pair of bolts 7A and the pair of bolts 7B.

For fixedly securing the thus assembled structure 31 with respect to the side wall structure 15, the mounting portion 11 may be secured to one of the guide rails for the elevator cage 16. The guide rail 34 is located at one corner of the elevator well or hoistway and includes a mounting section 10 having a flat surface adapted to abut against the mounting portion 11 of the plate 6. The guide rail 34 has two pairs of fixture members 32A and 32B each attached to the opposite edge portions of the mounting section 10 as depicted in FIG. 8. Each of the fixture members has a hole for a bolt. The mounting portion 11 is fitted over and fixedly secured to the flat surface of the mounting section 10 by means of two pairs of bolts 33A, 33B. The bolts 33A and 33B pass respectively through the fixture member 32A and the hole 9A in couple and the fixture member 32B and the hole 9B in couple. Thus, the cable assembly 3 is fixed at its one end portion with respect to the side wall structure 15 in a suspended fashion.

In FIG. 9, in order to mount the cable suspension structure 31 on the bottom 19 of the elevator cage 16, a mounting portion 11 of a plate 6 is secured to the elevator cage at its bottom frame 25 through a mounting bracket 35. The mounting bracket 35 includes a first mounting section 35A and a second mounting section or flange 38 formed integrally with and extending perpendicularly from the first mounting section 35A. The bracket 35 has two pairs of holes 36A, 36B formed in the first mounting section 35A, and two sets of holes 39, 39 formed in the second mounting section 38. The first mounting section 35A is fitted over and fixedly secured to the mounting portion 11 of the plate 6 by means of two pairs of bolts 37A, 37B passing respectively through the holes 36A and 9A in couple, and 36B and in 9B in couple. A pair of fixture members 32 are attached respectively to lower flanges 25A, 25A of the bottom frame 25 of the elevator cage frame 10'. Each of the fixture members 32 has a hole for a bolt. The second mounting portion 38 of the bracket 35 is fitted over and fixedly secured to the lower flanges 25A, 25A by means of a pair of bolts 33 passing through the fixture members 32, 32 and the holes 39, 39 as depicted in FIG. 9. Thus, the cable assembly 3 is fixed at the other end portion thereof with respect to the elevator cage 16 in a suspended fashion.

As described, in one aspect of the present invention, secure suspension of the cable assembly 3 comprising a predetermined number of flat type cables laid one upon another, can be attained only by holding the cable assembly between the holder member 1 and the keeper member 2 and clamping the members 1 and 2, and hence, the overall thickness $h_2$ of the cable suspension structure S is remarkably reduced as compared with the conventional one, as apparent from FIGS. 5 to 7. With this arrangement, the structure S can readily be accommodated within the limited, narrow space H between the side wall structure 15 and the elevator cage 16. Further, since there is required no folding and overlapping of the cable assembly 3 as in the case of the conventional structures, the necessary length of the cable assembly 3 can be reduced. This is desirable from an economical point of view. Furthermore, since the cable assembly 3 held between the holder member 1 and the keeper member 2 is forcibly bent or crooked in the thickness-wise direction by the coaction of the first retaining means e.g. the projection 4 and the second retaining means e.g. the groove 5, the cable assembly 3 is effectively prevented from being disengaged from or vertically displaced in the suspension structure due to its weight and can be securely, reliably suspended in the narrow space H between the side wall structure 15 and the elevator cage 16 for a prolonged period of time.

Moreover, in another aspect of the present invention, the cable assembly 3 is adjustably attached to the structure 31, utilizing the rows of slots 8A, 8B formed in the holder member 1. More specifically, the position of fixed disposition of the cable assembly 3 with respect to the side wall structure 15 is horizontally adjustable by selecting desired slots 8A, 8B for insertion of the two pairs of bolts 7A, 7B therein. Further, by virtue of the provision of the two rows of bolt holes 9A, 9B formed in the mounting portion 11, the structure 31 can readily be attached to the guide rail 34 in the hoistway or the bottom frame 25 of the elevator cage 16 by means of the bolts. The position of fixed disposition of the cable assembly 3 with respect to the guide rail 34 is horizontally adjustable by selecting desired holes 9A, 9B for reception of the bolts 33A, 33B. Further, the position of fixed disposition of the structure 31 with respect to the guide rail 34 is also vertically adjustable by changing the positions of fixation on the fixture members 32A, 32B with respect to the guide rail 34.

What is claimed is:

1. A flat type elevator cable suspension structure which comprises:

(a) a holder member rigidly fixedly secured with respect to the ground and having at its one side a first horizontally extending retaining means;
(b) a keeper member having at its one side a second horizontally extending retaining means; and
(c) a flat type elevator cable extending in substantially vertical direction and securely held between said holder member and said keeper member;

said holder and keeper members having their respective inner surfaces entirely contacted with the flat surfaces of said cable;

said first retaining means cooperating with said second retaining means to crook the flat type elevator cable in a thickness-wise direction, thereby engaging the flat type elevator cable therebetween.

2. A flat type elevator cable suspension structure according to claim 1, wherein said first retaining means is a horizontally extending projection formed on the side of the holder member and said second means is a horizontally extending recess formed on the side of the keeper member in an opposite relationship to said projection.

3. A flat type elevator cable suspension structure according to claim 1, wherein said first retaining means comprising a pair of horizontally extending recesses formed on the side of the holder member and said second retaining means comprises a pair of horizontally extending projections formed on the side of the keeper member respectively in opposite relationships to said pair of recesses.

4. A flat type elevator cable suspension structure according to claim 1, wherein said first retaining means comprises a first horizontally extending protruded section and a first horizontally extending thinned section which are formed on the side of the holder member in a vertically adjacent relationship to each other, and said second retaining means comprises a second horizontally extending thinned section and a second horizontally extending protruded section which are formed on the side of the keeper member in a vertically adjacent relationship of each other, said first protruded section and said first thinned section being complementary in shape to said second thinned section and said protruded section, respectively.

5. A flat type elevator cable suspension structure according to claim 1, wherein said holder member comprises an elongated plate having a holder portion and a mounting portion extending from said holder portion, said holder member having a longitudinally extending projection which is formed on said holder portion and constitutes said first retaining means, said holder portion and said mounting portion having a first fastening means and a second fastening means, respectively, and said keeper member comprises a plate which is substantially shorter in length than said holder member and has a horizontally extending recess constituting said second retaining means, said keeper member having a third fastening means which cooperates with said first fastening means to attach said keeper member to said holder member.

6. A flat type elevator cable structure according to claim 5, wherein said first fastening means comprises a pair of rows of horizontally elongated holes formed respectively in the upper and lower halves of said holder portion, said holes in rows being spaced from one another by a predetermined distance, said longitudinally extending projection being formed between said pair of rows of holes, and said third fastening means comprises a plurality of holes which are respectively in alignment with preselected holes of said pair of rows of holes of the holder portion and receive bolts passing there-through.

7. A flat type elevator cable suspension structure according to claim 1, wherein said second fastening means comprises a pair of rows of holes formed in said mounting portion and being horizontally arranged, with said rows being vertically spaced from each other, the holes receiving bolts for fixedly securing the mounting portion with respect to the ground.

8. A flat type elevator cable suspension structure according to claim 1, wherein said flat type elevator cable is composed of a pre-determined number of constituent flat type cables multi-laid one upon another to form a flat type cable assembly.

* * * * *